United States Patent [19]

Nelson et al.

[11] Patent Number: 5,280,955
[45] Date of Patent: Jan. 25, 1994

[54] CONSTRUCTION FOR A ROLLOVER PROTECTION STRUCTURE

[75] Inventors: Peter M. Nelson, Plano; Leo Chuzhoy, Dunlap; Anthony F. Cieszkiewicz; Steven D. Jones, both of Metamora; David E. Nelson, Peoria, all of Ill.

[73] Assignee: Caterpillar Inc., Peoria, Ill.

[21] Appl. No.: 936,482

[22] Filed: Aug. 28, 1992

[51] Int. Cl.$^5$ .............................................. B60R 21/13
[52] U.S. Cl. .................................. 280/756; 180/89.12; 296/189; 296/190
[58] Field of Search .............................. 280/756, 784; 180/89.12, 89.13, 89.19; 296/102, 189, 190, 205

[56] References Cited
U.S. PATENT DOCUMENTS 3,791,668  2/1974  Adams ................................ 280/150

OTHER PUBLICATIONS

AMCO's Catalog 203, Revision 4, entitled "AMCO's Heavy Duty Aluminum Structural Framing System", 1991.

*Primary Examiner*—David M. Mitchell
*Assistant Examiner*—Andrew C. Pike
*Attorney, Agent, or Firm*—William C. Perry

[57] ABSTRACT

The present invention provides a rollover protection structure that utilizes unitary corner members that are cast pieces that require no additional bracing. In addition, each corner member includes a leg portion that integrally defines an area of reduced cross-section. This reduction in cross-section creates an area of predictable deformation in the structure which will prevent the structure from collapsing on an operator stationed within the cab.

9 Claims, 3 Drawing Sheets

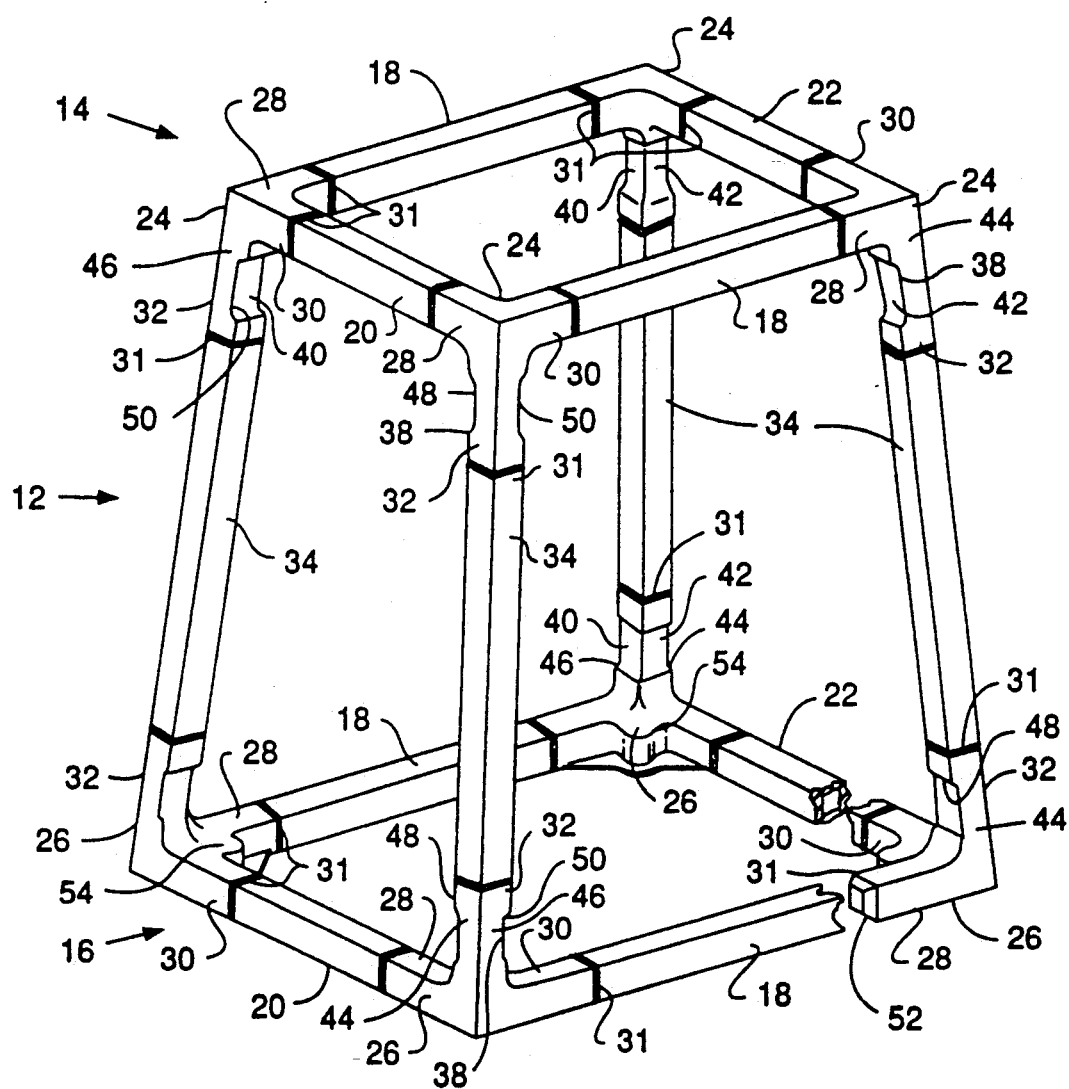

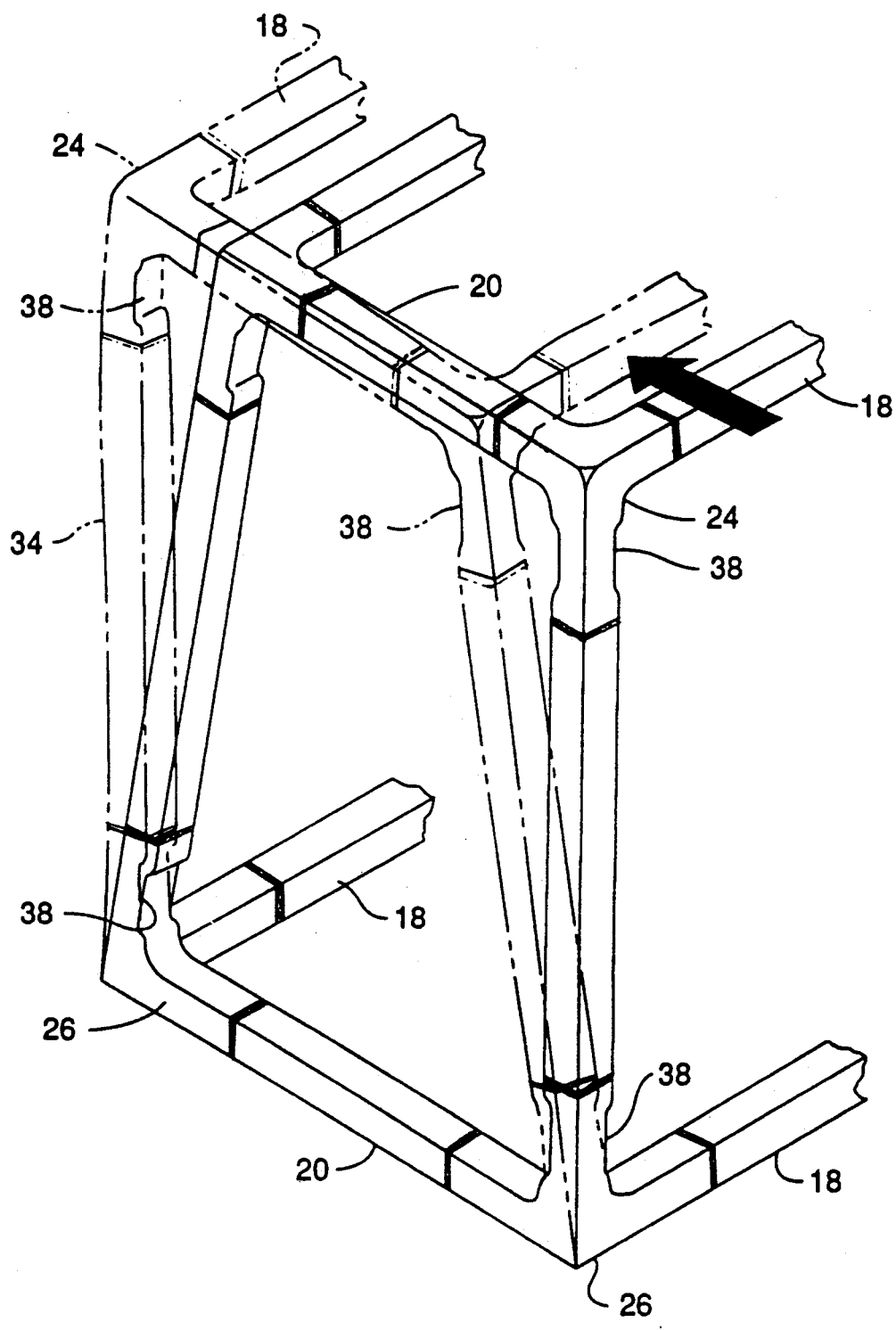

CONSTRUCTION FOR A ROLLOVER PROTECTION STRUCTURE

TECHNICAL FIELD

This invention relates generally to the construction of a rollover protection structure and more particularly to the construction of the corner members of the structure.

BACKGROUND ART

In the construction of modern day cab assemblies, it is common practice to build the cab around a very structurally sound framework. The framework is intended to withstand tremendous forces that would be applied to the cab in the event that the vehicle to which the cab was attached should happen to roll over. This structure must be able to withstand forces at least equal to the weight of the vehicle to prevent the occupant of the cab from being crushed as as the vehicle rolls over. This structure is commonly known as a rollover protective structure or ROPS.

The rollover protective structures are normally comprised of a plurality of tubular posts that are usually fixed together by welding. They normally consist of an upper rectangular section and a lower rectangular section that are joined by vertical posts that extend between the corners of the respective rectangular sections. Because the corner area joins three structural members that extend in three separate directions, it is inherently the weakest member of the structure. As a result, it must be heavily braced. Each corner member normally includes as many as six braces that extend between the individually directed structural members. This not only increases the complexity of the ROPS, it also increases the number of parts as well as the time required to fabricate the assembly.

In other instances, the rollover structure includes a pair of fabricated posts that have sufficient cross-sectional area to withstand the forces that would be applied to the structure in the event of a vehicle rollover. These types of structures have been known to include areas that have thinner cross-sections at preselected locations to allow a predetermined amount of plastic deformation. One such design is disclosed in U.S. Pat. No. 3,591,668, issued to Stanley B. Adams on Feb. 12, 1974. This design utilizes fabricated upright leg members that extend upwardly from the vehicle frame along each side of the vehicle. The leg members define upper and lower transition areas, or areas of reduced cross-section, to define plastically deformable hinge points upon application of forces that exceed a predetermined magnitude. In order to create these transition areas, the ROPS must be fabricated in such a manner to insure that the portion of the leg members immediately above and below the transition areas have a more rigid structure. In order to provide this rigidity, the structure utilizes several transverse and longitudinal brace assemblies. While this particular design has been known to work quite well in its intended capacity, it inherently requires many components and substantial time to fabricate and assemble the components.

The present invention is directed to overcoming one or more of the problems set forth above.

DISCLOSURE OF THE INVENTION

In one aspect of the present invention a rollover protection structure is provided that includes a frame assembly that has an upper and a lower portion, each of which is formed by a plurality of generally horizontally disposed post members. A plurality of generally vertically oriented post members are positioned between the respective upper and lower frame portions for securing them in spaced relationship to one another. The upper and lower frame portions include a corner member that has a first and second leg portion. Each first and second leg portion has a uniform cross-sectional area and is sufficient for connecting adjacent pairs of the horizontally oriented posts in the upper and lower frame portions. The corner member also includes a third leg portion that has a first and second cross-sectional area and is sufficient for connection with one of said vertically oriented posts.

In another aspect of the present invention a rollover protection structure for a vehicle is provided that includes a frame assembly that has an upper and a lower portion, each of which is formed by a plurality of generally horizontally disposed post members. A plurality of generally vertically oriented post members are positioned between the respective upper and lower frame portions for securing them in spaced relationship to one another. The upper and lower frame portions include a corner member that has a first and second leg portion. Each of the first and second leg portions define four sidewalls that are substantially equal in width along the entire length of each leg portion. The first and second leg portions are sufficient for connection with adjacent pairs of said horizontally oriented posts in said upper and lower frame portions. The corner members have a third leg portion that defines a first pair of sidewalls that are substantially equal in width and a second pair of sidewalls that define a portion of reduced width that is generally centrally positioned along the length of the third leg portion. The third leg portion is sufficient for connection with one of said vertically oriented posts.

In yet another aspect of the present invention a rollover protection structure is provided that has an upper frame portion that has a pair of identical, horizontally oriented, side post members and identical, horizontally oriented front and rear post members. The post members are arranged to form a generally rectangular shape that is joined at the corners thereof by identical corner members. A lower frame portion is included that has a pair of identical, horizontally oriented, side post members and identical, horizontally oriented, front and rear post members. The post members are arranged to form a generally rectangular shape that is joined at the corners thereof by identical corner members. A plurality of identical, vertically oriented post members are positioned to extend between respective pairs of upper and lower corner members to secure the upper and lower frame portions to one another in spaced, vertical relationship to each other.

The rollover protection structure as set forth above utilizes a corner member that is a single piece to connect the horizontal posts of the upper and lower frame portions as well as the vertical posts that extend therebetween. This greatly reduces the number of components that is required to fabricate a rollover protection structure. In addition, the leg portion of each corner member that is connected to the vertical posts is provided with an area of reduced cross-section. Being so configured, the reduction in cross-section provides an area of predictable deformation in the event of vehicle rollover. Since the corner member is sufficient for being made as a casting, this area of reduced cross-section lends itself to becoming an integral part of the casting. This greatly reduces the number of components that is required to fabricate a rollover protection structure which in turn reduces the time it takes to assemble the structure. When these factors are coupled with the costs that relate to the assembly of the structure, it can be seen that the subject design provides a very simple structure that may be manufactured at a greatly reduced cost.

BRIEF DESCRIPTION OF THE DRAWINGS

FIG. 2 is a perspective view of the rollover protective structure that provides the framework for the cab assembly; and FIG. 3 is a partial view of the rollover protection structure similar to that of FIG. 2., with deformation of the structure being indicated in phantom lines.

BEST MODE FOR CARRYING OUT THE INVENTION

Figure 1:
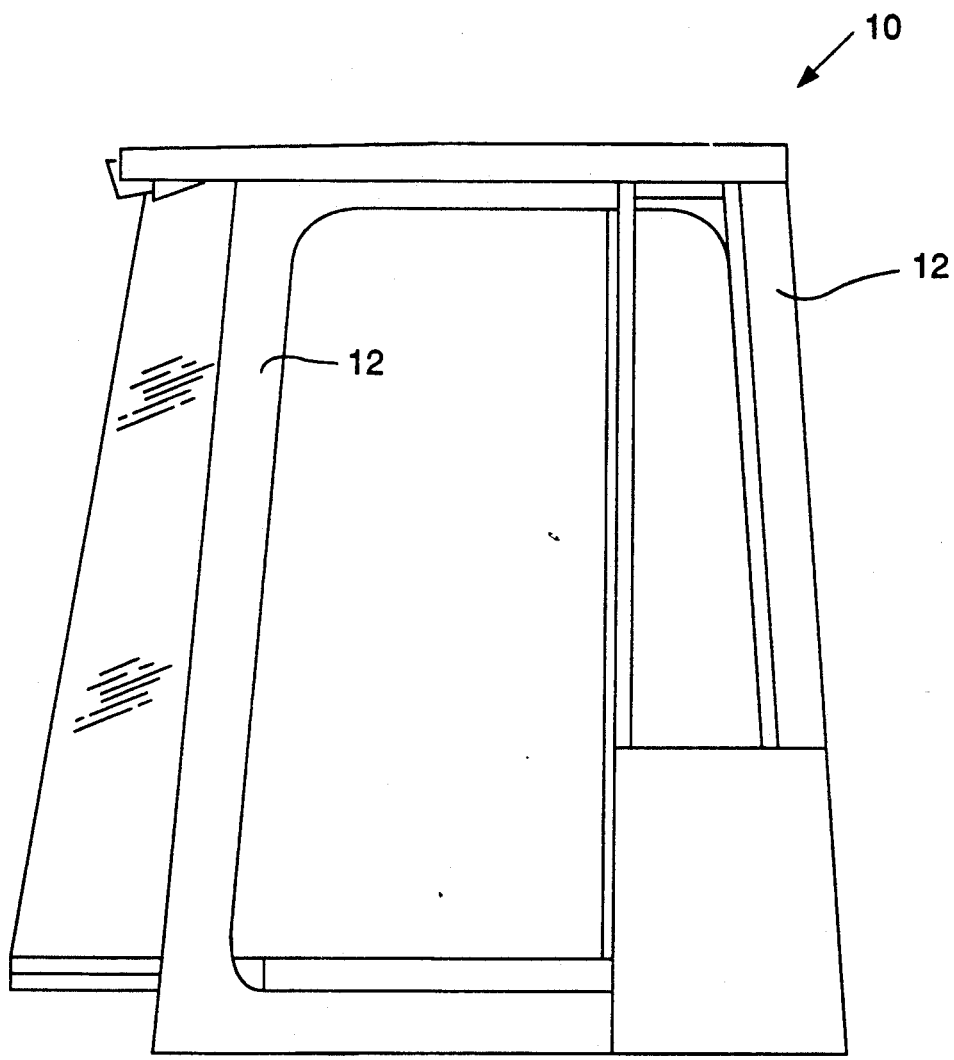
FIG. 1 is a side elevational view of a cab assembly that embodies the principles of the present invention.

Referring now to the drawings, it can be seen that a cab, shown generally at 10, is mounted to the main frame of a vehicle (not shown). The cab is built around a frame assembly 12 that also serves as a rollover protective structure, or ROPS, that is best illustrated in FIGS. 2 and 3. The ROPS includes an upper and lower frame portion 14 and 16 respectively, that are generally rectangular in configuration with the upper frame portion 14 being slightly smaller than the lower frame portion 16. Since the components of the respective frame portions are generally identical, aside from the above mentioned size variation, similar components will be identified by the same reference numerals.

Both frame portions 14 and 16 define a pair of generally horizontally disposed side supports 18, a front support 20, and a rear support 22 that are formed of hollow tubular post members. The post members are connected at the corners of the respective frame portions 14 and 16 by a unitary corner members 24 and 26 respectively. Each corner member is formed by a casting that defines a first, second and third leg portions 28, 30, and 32 respectively. The first and second leg portions 28 and 30 define a distal end portion 31 that are secured to an adjacent pair of the post members as by welding or the like. For example, a side support 18 of the upper frame portion 14 is secured to a first leg 28 of the corner member 24 while the second leg 30 thereof is secured to the front support 20. On its opposite end, the front support 20 is secured to the first leg portion 28 of the corner member on the opposite side of the cab whose second leg portion 30 is in turn connected to the other side support 18. The sequence continues around the upper frame portion to complete the rectangle. The same arrangement exists with respect to the lower frame portion 16 and the lower corner member 26. It should be noted that each of the first and second leg portions 28 and 30 of both corner members 24 and 26 are substantially square in configuration and define four sidewalls of substantially equal width along the entire length of the respective leg portions. Likewise, the tubular supports 18, 20, and 22 are rectangular in configuration and are of substantially the same outer dimensions as that of the respective leg portions.

The third leg portion 32, of each corner member 24 and 26 extends at a right angle from the plane in which the first and second leg members 28 and 30 are positioned. In the case of the upper corner member 24, the third leg portion extends in a downwardly direction, while the third leg portion of the lower corner member 26 extends in an upwardly direction in linear alignment with a third leg portion of the upper corner member. Between the opposing third leg portions is positioned a generally vertically extending tubular post member 34 that connects the respective upper and lower frame portions 12 and 14 respectively, to complete the structure. Like the first and second leg portions 28 and 30, the third leg portion 32 defines a distal end portion 31 that is generally square in configuration. The distal end portion 31 has substantially the same dimensions as the vertical post members 34 and is sufficient for attachment to the vertical posts as will be more fully described hereinafter. Along a central portion 38 of the third leg member, a pair of inwardly facing sidewalls 40 and 42 are formed that are generally planar along their length. A pair of outwardly facing sidewalls 44 and 46 are defined by the third leg member that have a pair of relieved portions or indentations 48 and 50 respectively formed thereon. Being so configured, the central portion 38 of the third leg portion defines a cross-sectional area that is substantially reduced cross-section with respect to the cross-sectional area of the post member or the portion of the leg on either side of the central portion.

As previously mentioned, each leg portion 28, 30, and 32 has a distal end portion 31 that attaches to one of the tubular posts. Each leg portion defines a generally rectangular relieved portion 52 that projects outwardly from the distal end portion of each leg portion. The dimensions of the rectangular projection are closely matched to the internal dimensions of the various tubular posts and support members. The projection is received within the tubular post and serves to locate the two components in order to aid assembly and also to provide a "backup" for the weld between the two components.

The corner members 24 and 26 differ only in the provision of a mounting structure that is incorporated in the casting of the lower corner member 26. Each of the lower corner members is provided with a boss 54 that is sufficient for being drilled and tapped from its lower side. In this manner, it is able to receive a mounting bolt (not shown) that extends upwardly from the vehicle frame to attach the ROPS thereto.

Industrial Applicability

When mounted on a vehicle, the rollover protection structure 12 serves as a framework to which the enclosing components of a cab assembly 10 may be mounted. While being an integral portion of the structure of the cab assembly, its main purpose is to prevent the collapse of the cab in the unlikely event that the vehicle to which it attached would roll over. The design parameters of the rollover protection structure require that it be able to withstand at least an amount equal to the entire weight of the vehicle without collapsing to a point wherein an operator, stationed within the cab, would be injured. In the event of a vehicle rollover, the forces that are normally applied to the ROPS would likely occur as side loads as the cab contacts the ground while the vehicle turns over. As the loads are applied to the cab, as shown for example in FIG. 3, the ROPS will deform at the corner members 24 and 26 in the region of the relieved portions 48 and 50 formed on the third leg portions 32 that define the reduced cross-sectional area, as is best shown in FIG. 3. Since the corner members are cast from steel material, the deformation characteristics are very predictable. Because of this, the deformation of the cab assembly may also be predicted thus insuring the safety of the operator.

With a rollover protection structure as set forth above, it can be seen that the structure not only provides very adequate protection for the operator, it does so in a manner that lends itself to a very efficient use of components. In fact, only seven different piece-parts (components that are identified by the same part number) are required to complete the ROPS framework as shown in the drawings. The structure requires one tubular member for the front and back of upper frame portion and one tubular member for each side. One corner member is required to join all four corners of the upper frame portion. The lower frame portion has the same piece-part requirement as the upper frame structure. The two frame portions are joined by identical vertical tubular posts. While not specifically shown in the drawings, a sheet metal closure plate, known as a falling object protection structure, may also be included in the structure for an additional piece-part. This is due in part, to utilizing castings to form the corner members 24 and 26. This alleviates the need for the extraneous brackets and gussets that were formerly required for strength. Also, since the corner members are casts piece parts, the hinge point or point of predictable deformation may also be incorporated into the casting. The combination of these factors allows the ROPS to be assembled with very few parts in a foreshortened period of time which results in greatly reduced costs in both parts and labor.

Other aspects, objects and advantages of this invention can be obtained from a study of the drawings, the disclosure and the appended claims.

We claim:

1. A rollover protection structure, comprising:
    a frame assembly having an upper and lower portion each of which is formed by a plurality of generally horizontally disposed support members;
    a plurality of generally vertically oriented post members positioned between the respective upper and lower portions of the frame assembly for securing them in vertically spaced relationship to one another; and
    a plurality of corner members having a first and a second leg portion that define four sidewalls having a substantially uniform width along the entire length of the respective leg portions and being sufficient for connection with adjacent pairs of said horizontally disposed support members in said upper and lower portions of the frame assembly and a third leg portion that defines a pair of inner sidewalls having a width equal to that of the sidewalls of the first and second leg portions and a pair of outer sidewalls that define a portion of reduced width along a generally central portion of their length, said portion of reduced width being narrower than said pair of inner sidewalls and being sufficient to extend across the entire width of the outer sidewalls, said third leg portion being sufficient for connection with one of said vertically oriented post members.

2. The rollover protection structure as set forth in claim 1 wherein the upper portion of the frame assembly is generally rectangular in configuration and includes four identical corner members.

3. The rollover protection structure as set forth in claim 1 wherein the lower frame portion is generally rectangular in configuration and includes four identical corner members each of which further defines a means for mounting the frame assembly to a vehicle frame.

4. The rollover protection structure as set forth in claim 1 wherein each corner member is formed of a one piece casting.

5. The rollover protection structure as set forth in claim 1 wherein each leg portion of said corner members has a distal end portion that defines a generally rectangular, relieved portion.

6. The rollover protection structure as set forth in claim 5 wherein the support and post members connected between the respective corner members are rectangular tube members that define an opening therethrough sufficient for receiving the rectangular relieved portion defined by the distal end portions of the corner members to facilitate the connection therebetween by welding.

7. The rollover protection structure as set forth in claim 1 wherein the third leg portion of the respective corner members of the upper frame portion are positioned to extend in a downward direction and the third leg portion of the respective corner members of the lower frame portion are positioned to extend in an upward direction.

8. The rollover protection structure as set forth in claim 7 wherein the sidewall portions of the third leg portion shaving the reduced width are positioned between the respective upper and lower frame portions and the point of attachment to the respective vertically oriented post member to provide a point of predictable deformation that is in close proximity to each of said upper and lower frame portions.

9. A rollover protection structure, comprising:
    an upper frame portion having a pair of identical, horizontally oriented, side support members and identical, horizonatlly oriented front and rear support members;
    a lower frame portion having a pair of identical, horizontally oriented, side support members and identical, horizontally oriented, front and rear support members;
    a plurality of identical, substantially vertically oriented post members that extend between respective upper and lower frame portions to secure the upper and lower frame portions to one another in spaced, vertical relationship to each other; and
    a plurality of substantially identical corner members positioned on each of a plurality of corners defined by the upper and lower frame portions to join the respective support members of each frame portion and the post members, each corner member having a first leg portion and a second leg portion, each of said leg portions being connected to one of the respective side support members and the front and rear support members, and a third leg portion that is connected to one of the respective post members, each of said first and second leg portions defining a plurality of sidewalls that have equal and uniform width, said third leg portion defining a pair of sidewalls that are uniform along their entire width and a pair of sidewalls that define a portion of reduced width that extends entirely across each of said sidewalls.

* * * * *